United States Patent [19]

Claar et al.

[11] Patent Number: 5,143,870
[45] Date of Patent: Sep. 1, 1992

[54] METHOD OF MODIFYING CERAMIC COMPOSITE BODIES BY A POST-TREATMENT PROCESS AND ARTICLES PRODUCED THEREBY

[75] Inventors: Terry D. Claar, Newark; Gerhard H. Schiroky, Hockessin; William B. Johnson, Newark, all of Del.

[73] Assignee: Lanxide Technology Company, LP, Newark, Del.

[21] Appl. No.: 551,352

[22] Filed: Jul. 12, 1990

Related U.S. Application Data

[63] Continuation-in-part of Ser. No. 296,239, Jan. 12, 1989, which is a continuation-in-part of Ser. No. 137,382, Dec. 23, 1987, Pat. No. 4,915,736.

[51] Int. Cl.$^5$ .................. C04B 35/56; C04B 35/65
[52] U.S. Cl. .......................... 501/87; 501/93; 501/96; 264/60; 264/65; 264/66
[58] Field of Search ............... 501/93, 87, 96; 264/60, 264/65, 66

[56] References Cited

U.S. PATENT DOCUMENTS

| | | | |
|---|---|---|---|
| 3,758,662 | 9/1973 | Tobin | 264/332 |
| 4,471,059 | 9/1984 | Yoshino et al. | 501/96 |
| 4,595,545 | 6/1986 | Sane | 264/65 |
| 4,605,440 | 8/1986 | Halverson | 75/238 |
| 4,692,418 | 9/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,885,130 | 12/1989 | Claar et al. | 419/12 |
| 4,885,131 | 12/1989 | Newkirk | 419/12 |
| 4,891,338 | 1/1990 | Gesing et al. | 501/87 |
| 4,904,446 | 2/1990 | White et al. | 419/13 |
| 4,915,736 | 4/1990 | Claar et al. | 75/238 |
| 4,940,679 | 7/1990 | Claar et al. | 501/96 |
| 5,004,714 | 4/1991 | Claar et al. | 501/134 |
| 5,011,063 | 4/1991 | Claar | 228/122 |
| 5,019,539 | 5/1991 | Claar et al. | 501/87 |
| 5,066,622 | 11/1991 | Claar et al. | 501/87 |

FOREIGN PATENT DOCUMENTS

| | | |
|---|---|---|
| 0165707 | 12/1985 | European Pat. Off. |
| 0193292 | 9/1986 | European Pat. Off. |
| 0239520 | 9/1987 | European Pat. Off. |
| 1492477 | 11/1977 | United Kingdom |

*Primary Examiner*—Karl Group
*Attorney, Agent, or Firm*—Mark G. Mortenson; Carol A. Lewis

[57] ABSTRACT

This invention relates generally to a novel method of manufacturing a composite body, such as a $ZrB_2$—$Zr$—$C$—$Zr$ composite body, by utilizing a post-treatment process and to the novel products made thereby. More particularly, the invention relates to a method of modifying a composite body comprising one or more boron-containing compounds (e.g., a boride or a boride and a carbide) which has been made by the reactive infiltration of a molten parent metal into a bed or mass containing boron carbide, and optionally one or more inert fillers, to form the body.

21 Claims, 5 Drawing Sheets

5,143,870

METHOD OF MODIFYING CERAMIC COMPOSITE BODIES BY A POST-TREATMENT PROCESS AND ARTICLES PRODUCED THEREBY

CROSS-REFERENCE TO RELATED APPLICATION

This application is a Continuation-in-Part of application Ser. No. 296,239, filed Jan. 12, 1989, in the names of Terry Dennis Clarr et al. which is a continuation-in-part of application Ser. No. 137,382, filed Dec. 23, 1987, now U.S. Pat. No. 4,915,736, in the names of Terry Dennis Claar and Gerhard Hans Schiroky, and entitled "A Method of Modifying Ceramic Composite Bodies by a Carburization Process and Articles Produced Thereby". The subject matter of each of the aforementioned applications is hereby expressly incorporated by reference.

FIELD OF THE INVENTION

This invention relates generally to a novel method of manufacturing a composite body, for example, a $ZrB_2$-$ZrC$-$Zr$ composite body, by utilizing a post-treatment process and to the novel products made thereby. More particularly, the present invention relates to a method of modifying a composite body comprising one or more boron-containing compounds (e.g., a boride or a boride and a carbide) which has been fabricated by the reactive infiltration of a molten parent metal into a bed or mass containing boron carbide, and optionally one or more inert fillers, to form the composite body.

BACKGROUND OF THE INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare boride-containing materials.

DISCUSSION OF RELATED PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of T. Dennis Claar et. al., and is entitled "Process for Preparing Self-Supporting Bodies and Products Producted Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal boride carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metalboride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material, may also affect the morphology of the resultant material.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. Patent application Ser. No. 07/296,770 (hereinafter referred to as "Application '770"), filed in the names of Terry Dennis Claar et al., on Jan. 13, 1989, and entitled "A Method of Producing Ceramic Composite Bodies", additional reactive infiltration formation techniques are disclosed. Specifically, Application '770 discloses various techniques for shaping a bed or mass comprising boron carbide into a predetermined shape and thereafter reactively infiltrating the bed or mass comprising boron carbide to form a self-supporting body of a desired size and shape.

U.S. Pat. No. 5,011,063 (hereinafter referred to as U.S. Pat. No. '063), which issued on Apr. 30, 1991, from U.S. Pat. application Ser. No. 07/560,491, filed Jul. 23, 1990, which was a continuation of U.S. Patent application Ser. No. 07/296,837 (hereinafter referred to as "Application '837"), filed in the name of Terry Dennis Claar on Jan. 13, 1989, and entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. The relative amount of reactants and process conditions may be altered or controlled to yield a body containing varying volume percents of ceramic, metal and/or porosity. Additionally, the self-supporting body which results comprises a boroncontaining compound, a nitrogen-containing compound and, optionally, a metal. Additionally, inert fillers may be included in the formed selfsupporting body.

A further post-treatment process for modifying the properties of produced ceramic composite bodies is disclosed in copending U.S. Pat. No. 5,004,714 (hereinafter U.S. Pat. No. '714 issued on Apr. 2, 1991, from U.S. Patent application Ser. No. 07/296,966 (hereinafter "Patent 714), filed in the names of Terry Dennis Claar et al., on Jan. 13, 1989, and entitled "A Method of Modifying Ceramic Composite Bodies By Post-Treatment Process and Articles Produced Thereby". Specifically, Patent '714 discloses that self-supporting bodies produced by a reactive infiltration technique can be post-treated by exposing the formed bodies to one or more metals and heating the exposed bodies to modify at least one property of the previously formed composite body. One specific example of a posttreatment modification step includes exposing a formed body to a siliconizing environment.

U.S. Pat. No. 5,019,539 (hereinafter Pat. '539 which issued on May 28, 1991, from U.S. Patent application Ser. No. 07/296,961 filed in the names of Terry Dennis Claar et al., on Jan. 13, 1989, and entitled "Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

The present invention has been developed in view of the foregoing and is an improvement over the prior art. Particularly, the present invention is directed to modifying a formed composite body.

The invention provides a method for modifying the resultant amount of parent metal present in a composite body. More particularly, in a first preferred embodiment, the amount of parent metal can be modified or controlled by exposing the composite body (e.g., the residual parent metal in the composite body) to a carburizing environment (e.g., either a gaseous carburizing species or a solid carbon material) which modifies the composition of the residual parent metal, thus modifying the properties of the residual parent metal. Moreover, the mechanical, physical, and thermal properties of the resultant composite body can also be modified. Parent metals such as zirconium, tantalum, titanium, hafnium, and alloys thereof, etc., are well suited for treatment by the carburizing processes according to the present invention.

In a second preferred embodiment, the amount of parent metal can be modified or controlled by exposing the composite body (e.g., the residual parent metal in the composite body) to a boriding environment (e.g., by heating a composite body containing unreacted parent metal in a substantially inert atmosphere while contacting (e.g., being embedded in) a mass comprising a boron source). The metal remaining in the composite reacts with the boron source to form a metal boride (e.g., a parent metal boride), thus modifying the properties of the resultant composite. The metal content of the composite can be controlled to provide a composite comprising about 0 to about 2 volume percent metal. Parent metals such as zirconium, tantalum titanium, hafnium, and alloys thereof, etc., are well suited for treatment by the boriding processes according to the present invention.

In a third preferred embodiment, the amount of parent metal can be modified or controlled by exposing the composite body (e.g., the residual parent metal in the composite body) to a nitriding environment (e.g., by heating a composite body containing unreacted parent metal in a substantially inert atmosphere while contacting (e.g., being embedded in) a mass comprising a nitrogen source). For example, the source of the a nitriding environment may be, for example, nitrogen gas (e.g., substantially oxygen-free nitrogen gas) and/or a bedding comprising nitrogen (e.g., ZrN). The following are examples of nitriding environments which may be utilized to nitride the residual parent metal within a composite body: (1) ZrN bedding/$N_2$ atmosphere; (2) ZrN bedding/Ar atmosphere; (3) inert bedding/$N_2$ atmosphere; and (4) no bedding/$N_2$ atmosphere. Further, oxygen is generally considered to be an undesirable impurity in a nitriding process which may be substantially eliminated by utilizing, for example, a bedding possessing gettering characteristics. Particularly, the metal remaining in the composite reacts with the nitride source to form a metal nitride (e.g., parent metal nitride), thus modifying the mechanical, physical, and thermal properties of the resultant composite. The metal content of the composite can be controlled to provide a composite comprising from about 0 to about 2 volume percent metal. Parent metals such as zirconium, tantalum, titanium; hafnium, and alloys thereof, etc., are well suited for treatment by the nitriding processes according to the present invention.

In a fourth preferred embodiment, the composite body may be modified or tailored by exposing the formed composite body to a high temperature assisted consolidation (e.g., hot isostatic pressing, hereinafter referred to as "HIPing" or HIPed; hot-pressing; etc.). Particularly, the flexural strength and density of the HIPed composite may be increased. In some aspects of the present invention, the increased flexural strength of the HIPed composite body may be due to a reduction or removal of microstructural inhomogenities. Moreover, a composite body which has been modified by a post-treatment process (e.g., carburizing) may be tailored further by HIPing.

This application refers primarily to $ZrB_2$-$ZrC$-$Zr$ composite bodies, hereinafter referred to as "ZBC" composite bodies. However, it should be understood that while specific emphasis has been placed upon ZBC composite bodies, similar manufacturing steps are applicable to titanium, tantalum, hafnium, and alloys thereof, etc., parent metal composite bodies as well.

Broadly, in a first preferred embodiment, after forming a ZBC composite according to the process disclosed in Patent '130, the ZBC composite is embedded in a graphite or carbon donor material bedding, which is contained in an appropriate refractory vessel. The filled refractory vessel is heated in, for example, an electric resistance furnace containing an argon atmosphere. During heating, it is believed that small amounts of $H_2O$ or $O_2$ become available for reaction. These small amounts of $H_2O$ or $O_2$ are either intrinsically present in the argon gas or are liberated from the graphite bedding material or the ZBC composite. Thus, upon heating, carbon in the graphitic bedding material can react with oxygen to form a gaseous carburizing species. It also is possible to provide a direct source of a carburizing species, such as, for example, a $CO/CO_2$ mixture or a $H_2/CH_4$ mixture. While not wishing to be bound by any specific theory, it is believed that carbon from the carburizing species dissolves into the $ZrC_{1-x}$ phase in the ZBC composite and the carbon can then be transported throughout the ZBC composite by a vacancy diffusion mechanism. Thus, carbon can be transported so as to contact the residual parent metal to form additional amounts of a parent metal-carbide phase (e.g., if zirconium is the parent metal, the phase $ZrC_{1-x}$ results due to the carburizing treatment). However, some carbon from the graphite bedding material may also be directly diffused into the $ZrC_{1-x}$ phase.

Likewise, in a second preferred embodiment, after forming a ZBC composite according to the process disclosed in Patent '130, the ZBC composIthe is embedded in a bedding comprising B₄C which is contained, for example, in a graphite crucible. The crucible is heated in a suitable vacuum furnace which is evacuated and backfilled with an inert gas, preferably argon. The furnace is heated and mainlained al a lemperalure sufficient to permit a reaction between any unreacted zirconium in the ZBC composite and the B₄C bedding. During heating, it is believed that the B₄C reacts with zirconium to form additional $ZrB_2$. Due to the boride formation or boriding, the mechanical, physical, and thermal properties of the composite may be modified. For example, as the volume percent of residual or unreacted zirconium parent metal decreases, the fracture toughness decreases. A similar relationship has been discovered in reference to 4-point bending strengths of ZBC composites that have been borided. However, due to the corrosion of residual parent metal, the high temperature strength of the composite body increases. Accordingly, by subjecting a ZBC composite to a boriding process, the mechanical properties of the composite can be tailored to provide a wide range of desired properties in the final product.

In a third preferred embodiment, after forming a ZBC composite according to the process disclosed in Patent '130, the ZBC composite may be nitrided. Specifically, a $ZrC-ZrB_2-ZrN$ composite may be formed. A ZBC composite may be embedded in a nitrogen donor material, for example, ZrN, which may be contained in a refractory vessel. The refractory vessel, such as $Al_2O_3$, is heated, for example, in an electric resistance heated vacuum furnace. During heating, it may be desirable for nitrogen gas to pass through the furnace. Without intending to be bound by any specific theory, it is believed that the formation of ZrN is a diffusion controlled process wherein nitrogen diffuses into the bulk of the ZBC to react with any residual zirconium in the ZBC composite. As zirconium nitride is formed, it is believed the nitride phase dissolves into the carbide to form $Zr(C_xN_{1-x})_y$. Accordingly, by subjecting a ZBC composite to a nitriding process, the mechanical, physical, and thermal properties of the composite can be tailored to provide a wide range of desired properties in the final product.

Such post-treatment processing is advantageous because it permits conversion of a metal (e.g., residual parent metal) phase into, for example, a harder and more refractory phase. Specifically, in applications which require high temperature strength, a ZBC composite begins to lose strength at a temperature at or above the melting point of the residual parent metal phase. During post-treat of a ZBC composite by a carburization process, a boriding process and/or a nitriding process, I5 the parent metal phase is converted, for example, inlo a carbide of the parent metal (e.g., Zr parent metal is converted to ZrC). The amount of parent metal which typically remains in a ZBC composite produced according to the method in Patent '130 is about 5–40 volume percent. Upon exposing the ZBC composite to a post-treatment process, the amount of residual zirconium parent metal remaining can be reduced to, for example, about 0 to about 2 volume percent.

Moreover, the present invention is not limited to the utilization of a gas and/or bedding containing a diffusing species. Specifically, any technique or environment is acceptable which induces a suitable quantity of nitrogen, boron, carbon, etc., to be transported into the bulk of the composite being subjected to a post-treatment process (e.g., plasma, ionbeam, sputtering, etc.). Accordingly, the present invention is directed to modifying or tailoring ZBC bodies to permit these bodies to be utilized in a wider range of product applications.

The modified ZBC composite is useful for aerospace components such as nozzle inserts because the low metal content permits the ZBC composite to be used in even higher temperature applications than previously thought possible, without significantly compromising the fracture toughness and thermal shock resistance of the ZBC composite body. Thus, the posttreatment process of the present invention is particularly applicable for applications which require a resistance to high temperature erosion, have good thermal shock properties, and have a relatively high elevated temperature strength at a temperature of, for example, 2200°–2700° C.

Moreover, because each post-treatment process is time-dependent, a post-treatment zone or surface (e.g., a carburized, borided, nitrided, etc., zone or region) can be created adjacent to at least a portion of the surface region of a ZBC composite body. Thus, an exterior surface of the ZBC composite body can be modified to be, for example, more wearresistant, while the ZBC composite core which retains a relatively high metal content possesses different properties such as a relatively high o fracture toughness in comparison to the modified surface region. Such a ZBC composite body would be particularly applicable in the manufacture of wear plates, wear rings, and impeller inserts for various corrosive and erosive industrial pump applications. Specifically, zirconium metal has a relatively high corrosion resistance to strong acids, but the metal, by itself, has poor Wear characteristics. Thus, by modifying a ZBC composite body, a wear-resistant ceramic outer surface can be fabricated with a corrosion-resistant composite interior. Moreover, if substantially all of the zirconium metal is transformed to a ceramic phase (e.g., a $ZrC_{1-x}$ phase), and the post-treatment process (e.g., carburization) is continued, it is possible to increase, for example, the carbon content in the $ZrC_{1-x}$ phase (e.g., from about $ZrC_{0.58}$ to about $ZrC_{0.96}$). If such conversion is induced to occur, then the hardness and refractory properties of the ZBC composite can be expected to increase. Substantially parallel analysis can be made to each of the boriding and nitriding post-treatment processes.

Thus, the present method, and the novel composite body produced therefrom, even further expand the potential applications for ZBC composite bodies.

BRIEF DESCRIPTION OF THE DRAWING(S)

FIG. 1 is a schematic elevational view in cross-section showing a ZBC composite body 3 embedded in a graphitic powder bedding 2 and contained within a refractory vessel 1, to be processed according to the present invention.

DETAILED DESCRIPTION OF THE PREFERRED EMBODIMENTS

Figure 1:
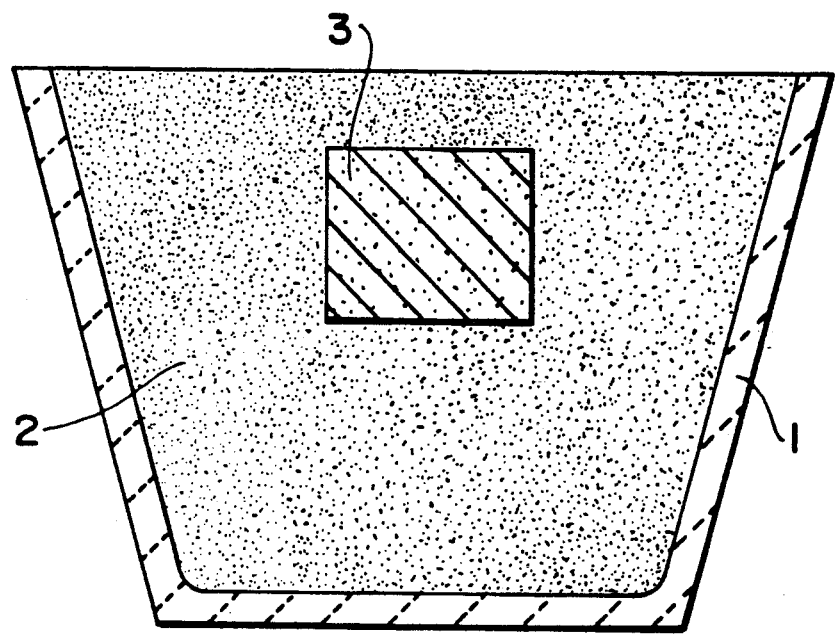

The present invention is based on the discovery that the properties of a ceramic composite body, particularly a ceramic composite body which is manufactured by reactive infiltration of a parent metal comprising zirconium, hafnium, tantalum, titanium, etc., into a permeable mass, for example, cOmprising boron carbide, can be modified by a post-manufacturing treatment. Such post-manufacturing treatments comprise a carburization process, a boriding process, a high temperature assisted consolidation (e.g. HIPing) and/or a nitriding process. Each of the above-mentioned post-manufacturing treatments can alter the microstructure, and thus the resultant mechanical, physical, and thermal properties, of a portion or substantially all of a ZBC composite body.

In a first preferred embodiment, a ZBC composite body, produced according to Patent '130 (discussed above herein), can be modified by exposing the composite to a gaseous carburizing species. Such a gaseous carburizing species can be produced by, for example, embedding the ZBC composite body in a graphite bedding and reacting at least a portion of the graphitic bedding with moisture or oxygen in a controlled atmosphere furnace. However, the furnace atmosphere should comprise typically, primarily, a non-reactive gas such as argon. The use of grade 5 argon gas from Matheson Gas Products, Inc., produces desirable results. It is not clear whether impurities present in the argon gas supply the necessary $O_2$ for forming a carburizing species, or whether the argon gas merely serves as a vehicle which contains impurities generated by some type of volatilization of components in the graphitic bedding or in the ZBC composite body. In addition, a gaseous carburizing species could be introduced directly into a controlled atmosphere furnace during heating of the ZBC composite body.

Once the gaseous carburizing species has been introduced into the controlled atmosphere furnace, the lay-up should be designed in such a manner to permit the carburizing species to be able to contact at least a portion of the surface of the ZBC composite body buried in the loosely packed graphite powder. While not wishing to be bound by any specific theory, it is believed that carbon in the carburizing species, and/or carbon from the graphitic bedding, will dissolve into the interconnected zirconium carbide phase and/or the zirconium metal, which can then transport the dissolved carbon throughout substantially all of the ZBC composite body, for example, by a vacancy diffusion. The diffusion of carbon into the residual zirconium parent metal is relatively low (e.g., when the processing temperature is below about the melting point of the parent metal). Thus, absent the zirconium carbide phase, it would be less practical, or economical, to attempt to dissolve carbon throughout all of the residual zirconium metal in the ZBC composite body, because the process would take a relatively long period of time (e.g., the rate of diffusion is dependent upon the temperature and the diffusion coefficient). In this regard, the diffusion of carbon in the zirconium carbide phase and in the zirconium metal phase are both time dependent. However, the rate of transport of carbon in the zirconium carbide phase is much faster than the transport rate of carbon in the zirconium metal phase. Once a desirable amount of carbon has been diffused into the ZBC composite body and contacts residual zirconium parent metal, the zirconium parent metal is substantially converted into ZrC. Such conversion is desirable because the modified ZBC composite will have an increased hardness and an increased elastic modulus, at the limited expense of both flexural strength and toughness. Moreover, the elevated temperature properties will also improve because of a lower metal content in the ZBC composite. It has been discovered that ZBC composites having a residual parent metal in an amount between 5 to 30 volume percent can be modified by a post-carburization treatment to result in about 0 to about 2 volume percent, typically about ½ to about 2 volume percent, of parent metal remaining in the ZBC composite body. Thus, substantially all of the parent metal, however, typically about 4-½ to 28 volume percent of the parent metal, can be transformed from zirconium into ZrC.

While not wishing to be bound by any specific theory, the following discussion is believed to explain the manner in which carburization occur within a ZBC body. Specifically, carburizing a ZBC body may be dependent upon the ability to induce movement of carbon through the ZBC body at a sufficient rate. The flux or movement of carbon is generally proportional to the product of the diffusivity of carbon times the solubility of carbon into the ZBC body. Particularly, below the melting point of Zr (e.g., about 1850° C.), the diffusivity of C into the Zr phase is greater than in the $ZrC_x$ phase, whereas the solubility of C in the Zr phase is relatively low. Thus, the product of solubility and diffusivity may be relatively higher in the carbide phase than in the Zr phase and accordingly, the carbon transport may occur substantially through the carbide phase in comparison to the metal phase. For temperatures above 1850° C., Zr may be liquid and the solubility of C increases whereas the diffusivity of carbon tends to be relatively constant. Accordingly, it is believed that in this higher temperature regime (e.g., above the melting point of zirconium), transport of carbon is primarily through the Zr phase with a relatively smaller quantity of carbon being transported within the carbide phase.

Moreover, by controlling the time of exposure of the ZBC composite body to any one of the post-manufacturing treatments, namely, the carburizing, boriding, HIPing and/or nitriding and controlling the temperature at which these processes occur, a modified zone or layer can be formed on at least one exterior surface of a ZBC composite body. Further, in some aspects of the present invention, a plurality of post-manufacturing treatments may be desirably conducted simultaneously or sequentially. Such post-treatment processes can result in a hard, wear-resistant surface surrounding a core of ZBC composite material having a higher metal content and higher fracture toughness.

In summary, it has been found that by subjecting a ZBC composite containing, typically between about 5-30 volume percent of residual zirconium parent metal, to a carburizing, a boriding, and/or a nitriding species in a controlled atmosphere furnace operating at a temperature of about 1500°-2200° C., for a period of time of about 5-48 hours that a modified ZBC composite will be formed resulting in a more desirable composite body.

The following are examples of the present invention. The examples are intended to be illustrative of various aspects of a post-manufacturing treatment of a composite body, particularly a ZBC composite body. However, these examples should not be construed as limiting the scope of the invention.

EXAMPLE 1

A ZBC composite body formed according to Example 1 disclosed in Patent '130, was produced. Table 1 shows various mechanical properties of the formed ZBC composite body. All surfaces of the ZBC composite body were degreased ultrasonically by using acetone and ethanol. The ZBC composite was then buried in a high purity graphite powder bedding having an average particle diameter of about 75 microns. The graphite powder was purchased from Lonza, Inc., and was identified as KS-75. The graphite powder bedding was contained within a graphite mold (Grade ATJ from Union Carbide). The mold was covered on a top surface thereof with a graphite cover plate. The complete assembly of the buried ZBC composite body was then placed into a closed atmosphere resistance heating furnace. The atmosphere in the furnace was grade 5 argon from Matheson Gas Products, Inc. The furnace was first evacuated at room temperature to a pressure of $1 \times 10^{-4}$ Torr and thereafter backfilled with argon. The furnace was then evacuated to a pressure of about $1 \times 10^{-2}$ Torr and thereafter heated to a temperature of about 500° C. under vacuum. The furnace was again backfilled with argon which then remained flowing at a rate of about one liter per minute and was maintained at a qauqe pressure of about 2 psig. The furnace was heated to a temperature of about 1750° C. over a 6-hour period and then held at 1750° C. for about 12 hours. The furnace was then cooled for about 6 hours. After cooling, the carburized ZBC composite was removed from the furnace and any excess graphite powder was removed by grit blasting.

Table 1 shows the mechanical properties of the ZBC composite after the carburization treatment had been affected. It is evident that the amount of residual zirconium parent metal was reduced from about 10% to about ½%, by volume; the hardness, elastic modulus, and shear modulus all increased. However, the increase occurred at the limited expense of flexural strength. It is noted that a flexural strength of about 500 MPa is adequate for many aerospace applications.

TABLE 1

|  | Before Carburization | After Carburization |
|---|---|---|
| Zr Content, vol % | 9.9 | 0.5 |
|  | 80.6 HRA | 81.9 HRA |
| Hardness | 1011 HK | 1388 HK |
| Elastic Modulus, GPa | 364 | 442 |
| Shear Modulus, GPa | 158 | 184 |
| Flexural Strength MPa (4-point) | 875 | 497 |

EXAMPLE 2

A preform comprising B$_4$C was formed by mixing about 477 grams of 1000 grit B$_4$C, about 9.5 grams of Dow XUS 40303 binder and about 715 grams of methylene chloride which mixture was sediment cast into a 7 inch diameter ATJ graphite mold. Before sediment casting, the graphite mold was sanded with a relatively coarse grit sandpaper. The preform was placed into a furnace in order to burnout or remove the binder. The furnace was then evacuated and backfilled with argon. During the subsequent heating step, argon was passed through the furnace at a rate of approximately 2 liters per minute. The furnace was heated from room temperature up to about 200° C. in about four hours. This temperature was maintained for approximately two hours. The furnace was heated from about 200° C. to about 50° C. at a rate of approximately 20° C. per hour. The temperature was increased from about 350° C. to about 450° C. in about two hours. The furnace was permitted to cool to room temperature in approximately eight hours. The preform weighed about 466 grams and measured about seven inches in diameter and about 0.6 inches in thickness.

A nuclear grade zirconium sponge weighing about 2333.25 grams supplied by Western Zirconium was cleaned and air dried at about 45° C. for one hour and at 70° C. for at least two hours. The zirconium sponge was placed directly on top of the B$_4$C preform inside the graphite mold. The graphite mold was placed on top of a 10×10×4 inch inverted AGSX boat into an electric resistance vacuum chamber furnace. The furnace was evacuated and backfilled with argon. A vacuum was drawn on the furnace and the furnace was brought to a temperature of about 1000° C. After 1000° C. was reached, argon at 2 liters/min was passed through the furnace having a chamber pressure of about 2 psig. Heating was continued until a temperature of about 1900° C. was reached. The total time to reach 1900° C. was about 8.5 hours. This temperature was maintained for approximately one hour. The furnace was permitted to cool to room temperature in about 12 hours. The graphite crucible was removed from the furnace and inspected. It was discovered that the zirconium sponge had reactively infiltrated the B$_4$C to form a platelet reinforced composite comprising zirconium diboride and zirconium carbide.

The platelet reinforced composite weighed approximately 2670 grams. The composite was lightly sand blasted in order to remove unreacted B$_4$C. After the sand blasting treatment, the composite weighed approximately 2570 grams and measured approximately 7 inches in diameter and about one inch in thickness. The formed composite then was subjected to a boriding treatment.

Specifically, the above described platelet reinforced composite was embedded in 1000 grit B$_4$C in a graphite crucible having an inner diameter of approximately 8 inches. The amount of B$_4$C utilized weighed approximately 521 grams and was obtained from ESK. The graphite crucible containing the platelet reinforced composite and the B$_4$C bedding material was placed into a vacuum furnace. The furnace was evacuated and backfilled with argon. The furnace was heated at a rate of approximately 300° C. per hour. When a temperature of about 1000° C. was reached, argon was passed through the furnace at a rate of approximately 2 liters per minute. The chamber pressure was about 2 psig. The furnace was continually heated until a temperature of about 1900° C. was obtained. This temperature was maintained for about 30 hours. The furnace was permitted to cool to room temperature at a rate of approximately 200° C. per hour. The graphite crucible was removed and inspected. It was discovered that the B$_4$C bedding had reacted with residual zirconium metal in the ZBC platelet reinforced composite. The borided composite had a reduced metal content on the order of about 0-2 volume percent.

Figure 2:
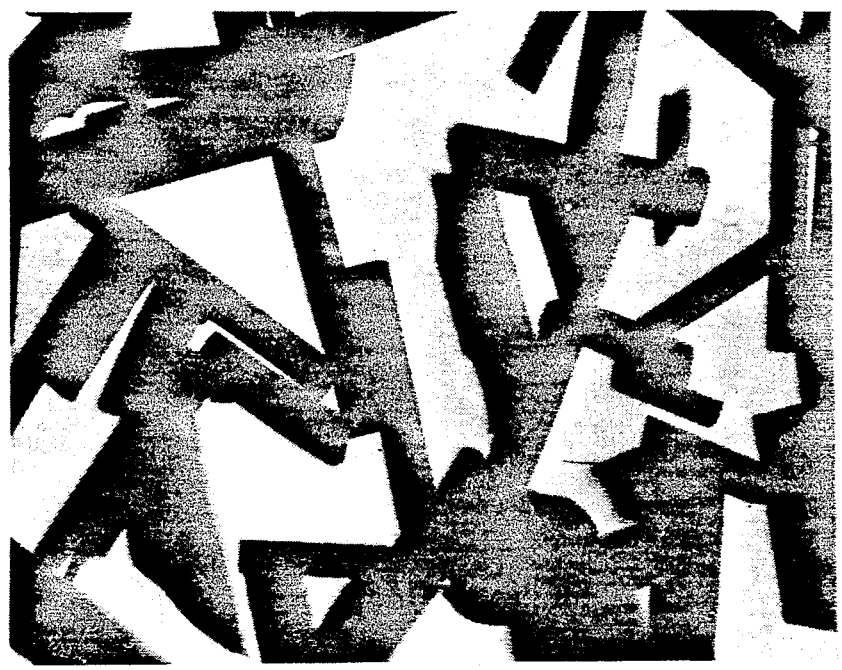
FIG. 2 is a photomicrograph at 1000× of a section of the composite produced according to Example 2.

FIG. 2 is a photomicrograph at 1000× of a section of the modified ZBC composite produced according to the method of Example 2. The darker regions are platelets of ZrB$_2$. The gray region comprise ZrC$_2$.

EXAMPLE 3

A ZBC body was formed substantially according to the procedures set forth in Example 1 in Patent '130. All surfaces of the ZBC composite were degreased and ultrasonically cleaned by utilizing acetone and ethanol. The ZBC body weighed approximately 3.6 grams and was embedded in 1.0–5.0 micron ZrN powder which was contained in an Al$_2$O$_3$ refractory boat. The Al$_2$O$_3$ boat containing the ZrN powder and the ZBC body was placed into an electric resistance tube furnace. The furnace was evacuated and backfilled with dried nitrogen gas. During subsequent heating steps, nitrogen was passed through the furnace at a rate of approximately 300° C. per minute. The furnace was heated at a rate of approximately 200° C. per hour until a temperature of about 1600° C. was reached. This temperature was maintained for about 12 hours. The furnace was cooled at a rate of approximately 200° C. per hour. The alumina crucible was removed from the furnace and inspected. It was discovered that a nitrogen species had reacted with the ZBC body to form a ZrN phase.

Figure 3:
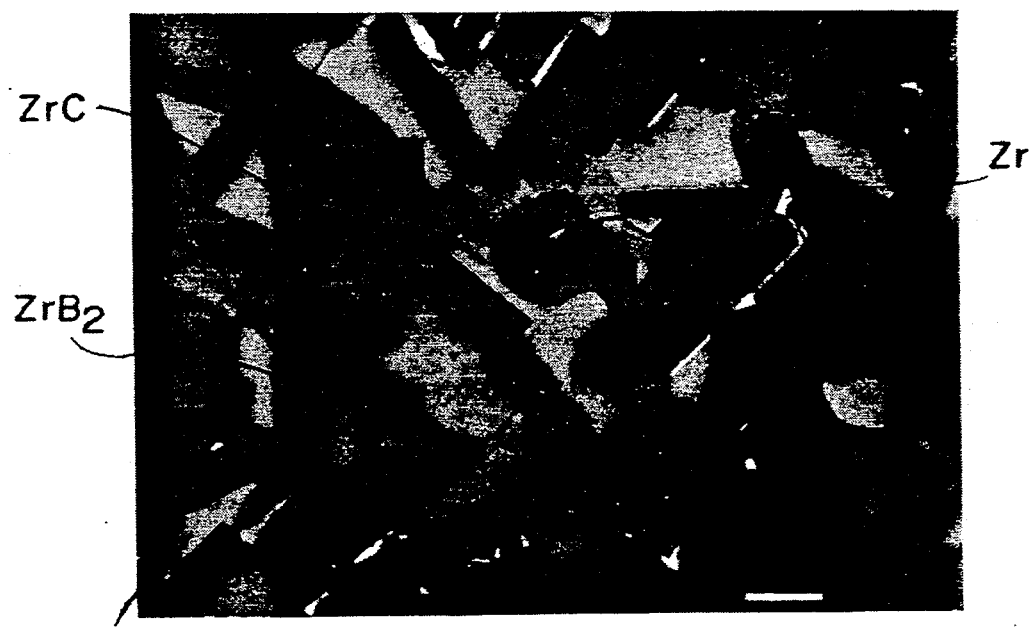
FIG. 3 is a photomicrograph at 1000× of a section of the composite produced according to Example 3.

FIG. 3 is a photomicrograph at 1000× of a section of the modified ZBC composite produced according to the method of Example 3. The darkest areas correspond to platelets of ZrB$_2$. The dark region in the upper left hand side, which is defined by ZrB$_2$ platelets, comprises ZrC. The lighter region on the lower left-hand side comprises Zr(C$_x$N$_{1-x}$)$_y$. The lightest region comprises Zr metal.

EXAMPLE 4

Rectangular ZBC bodies were made substantially in accordance with the procedures set forth in Example 1 of the '533 application. The ZBC bodies (labelled A through H) were embedded within a bedding comprising Cancarb ® carbon black powder inside an AGSX graphite boat.

The boat and its contents were placed inside a vacuum/inert atmosphere furnace. The furnace chamber was twice evacuated and backfilled with argon gas. During the subsequent heating steps, argon was passed through the furnace at a rate of about 500 cc/min which produced a furnace chamber pressure of 2 (gauge) psig. The temperature was raised from room temperature to about 1500° C. in 5 hours and held there for approximately 24 hours. The temperature of the furnace was cooled to room temperature.

Upon removal from the furnace, each sample showed a carburized layer approximately 1 mm thick upon the surface which was in contact with the carbon black. The carburization substantially converted the free zirconium metal within the ZBC into a carburized layer comprising zirconium carbide (i.e., ZrC$_x$).

The following Table 1 exhibits the percent weight gain for seven samples which were processed in accordance with this Example. Specifically, a greater weight gain corresponds to a greater degree of carburization (e.g., a thicker zone of of zirconium carbide upon the ZBC body).

TABLE 1

| Sample | Sample Size | Percent Weight Gain |
| --- | --- | --- |
| A | 1" × 2" | 0.24 |
| B | 1" × 2" | 0.23 |
| C | 1" × 2" | 0.22 |

TABLE 1-continued

| Sample | Sample Size | Percent Weight Gain |
| --- | --- | --- |
| D | 1" × 2" | 0.18 |
| E | 1" × ¾" | 0.26 |
| F | 1" × ¾" | 0.23 |
| G | 1" × ¾" | 0.30 |
| H | 1" × ¾" | 0.25 |

Figure 4:
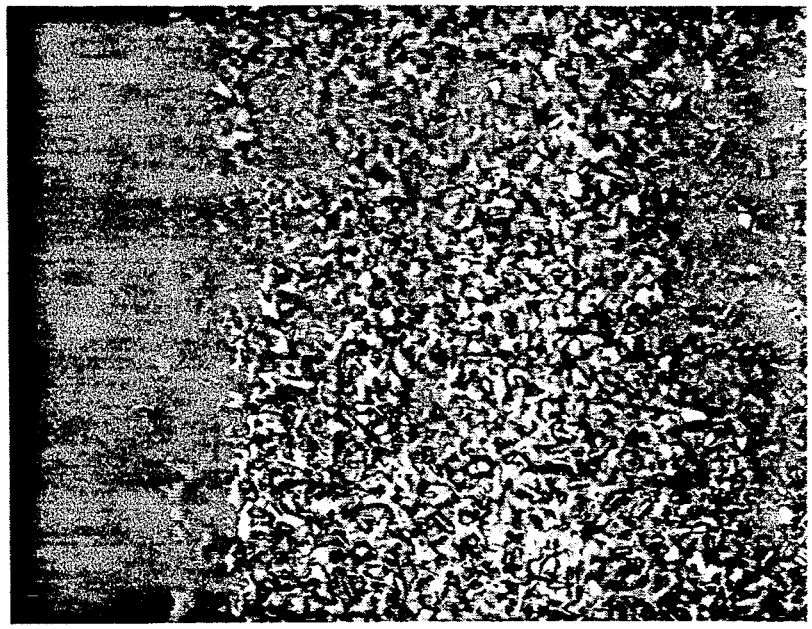
FIG. 4 is a photomicrograph at 50× of a section of the composite produced according to Example 4.

FIG. 4 is a photomicrograph at 50× of a section from the aboveidentified Sample A. For example, the carburized zone comprising zirconium carbide in Sample A is approximately 1 mm in thickness and is represented in FIG. 4 by the lighter colored region on the left hand side of the photomicrograph.

EXAMPLE 5

A ZBC body was formed using the techniques disclosed in the '533 application. The ZBC body was a rectangular parallel piped measuring about 0.17×0.24×0.8 inches and weighed 2.3 grams. The ZBC body was substantially embedded in boron powder (from the AEE Co., Crystalline Boron, −325 mesh, 98–99% purity) inside an AGSX grade graphite crucible.

The crucible and its contents were placed in an AVS vacuum/inert graphite resistance heated furnace which was then twice evacuated and backfilled with 99.999% pure argon gas (supplied by Airco Products). During the subsequent heating steps, argon gas was passed through the furnace at a rate of about 2 liters/minute. The temperature was then raised from room temperature to about 1500° C. in 4 hours, held there for about 12 hours and then cooled to room temperature in 3 hours.

After removal from the furnace, visual inspection showed that the color of the sample changed from a metallic appearance to a light grey. A borided layer of about 150 microns was formed by substantially converting free zirconium metal within the borided layer into ZrB$_2$.

The boriding process of this Example was conducted at a temperature below the melting point of the zirconium parent metal. Particularly, by utilizing a temperature greater than the melting point of the Zr metal phase of the ZBC body, the degree of boridization may be increased.

EXAMPLE 6

Example 5 was substantially repeated, but the boron powder was replaced with boron carbide (B$_4$C) powder (500 grit, ESK Co.). The ZBC body measured about 0.17×0.24×0.9 inches and weighed about 2.4 grams. After reaction, the sample changed color to a light grey and had a reacted (i.e., borided) to a depth of about 150 microns. However, the zirconium metal within the ZBC body was not converted entirely into a boride and thereby produced a core of ZBC surrounded by a layer comprising ZrC and ZrB$_2$.

EXAMPLE 7

A ZBC body was formed from a 7-inch diameter preform prepared by mixing 60% by weight of methylene chloride (from J.T. Baker Co.) with 1% by weight of an organic binder (Dow Experimental Binder XUS 40303.0, lot 861230-2) to form a solution into which about 39% by weight B$_4$C powder (1000 grit ESK, Lot M9-B, dried at 110° C.) was added. The mixture was then stirred to get a high viscosity slip which was sediment cast into a 7-inch diameter graphite ATJ grade boat which was presoaked with methylene chloride for one hour. The crucible with the mixture was air dried until all the solvent visually disappeared and dried further in an oven at about 45° C. for 1 hour and heated further at about 70° C. for 2 hours to remove the remaining traces of solvent.

The crucible containing the preform was placed inside an AVS vacuum/inert graphite electric resistance furnace which was twice evacuated and backfilled with argon gas. During the subsequent heating steps, argon was passed through the furnace at a rate of about 2 liters/min. The furnace was heated from room temperature to about 200° C. in 4 hours, held at 200° C. for 2 hours, heated from about 200° C. to about 350° C. at 20° C. per hour and heated further from 350° C. to 450° C. in about 2 hours. The preform was cooled to room temperature in about 8 hours resulting in a density of 1.24 g/cm and a thickness of about 0.59 inches.

Approximately 2333 grams of zirconium metal sponge (Western Zirconium Nuclear Grade, lot 4903) was placed upon the preform to comprise an assembly.

The assembly was placed on top of a 10-inch by 10-inch by 4-inch thick AGSX boat and inside an AVS vacuum/inert graphite resistance heated furnace which was evacuated and backfilled with 99.999% pure argon gas (supplied by Airco Products). The furnace was heated under a vacuum to about 1000° C. at which time the argon gas was permitted to flow through the furnace at a rate of 2 liters/minute. The assembly was heated further to about 1900° C. in a total of 8.5 hours, held there for about 1 hour and cooled to room temperature in 12 hours.

After removal of the assembly from the furnace, the excess $B_4C$ (e.g., about 100 grams) was removed from the composite by sandblasting.

The formed ZBC body was about 7 inches in diameter and had about 1 inches cut off one side before being placed within a bedding of 1000 grit $B_4C$ (ESK Co. lot M9) inside an 8 inch diameter ATJ grade graphite crucible. The ZBC body weighed about 2103 grams prior to processing.

The crucible and its contents, the ZBC body and the bedding, were placed inside an AVS vacuum/inert graphite resistance heated furnace which was evacuated and backfilled with argon gas. The furnace was heated under vacuum to about 1000° C. at which time the argon gas was permitted to flow through the furnace at a rate of about 2 liters/minute. The assembly was further heated to about 1900° C. at a total rate of about 300° C. per hour, held there for about 30 hours and then cooled to room temperature at a rate of 200° C. per hour.

After removal from the crucible the sample was analyzed and indicated the presence of the following phases: about 61 area percentage $ZrB_2$; about 38 area percentage ZrC; and 1 area percentage Zr. The sample displayed room temperature mechanical properties of a shear modulus of about 175 GPa; a Young's Modulus of about 422 GPa; and a Poisson's ratio of about 0.205. Also, the sample had a room temperature toughness of about 11 MPa-m and a room temperature strength of about 693 MPa.

EXAMPLE 8

A ZBC body was formed by substantially the techniques disclosed in the Patent '130. The ZBC body was a rectangular parallelepiped with dimensions of about 2.55 cm long by 0.55 cm thick by 0.44 cm wide and weighed about 3.8 grams. The ZBC body was substantially embedded in ZrN powder (99.8 $, 1-5 micron, Atlantic Equipment Engineers) within an alumina crucible.

The crucible and its contents were placed inside a Lindberg electric resistance tube furnace which was twice evacuated and backfilled with 99.999% pure argon gas (supplied by Airco Products). During the subsequent heating steps, argon was passed through the furnace at a rate of about 500 cc/minute. The temperature was raised from room temperature at a rate of 250° C. per hour to a temperature of about 1600° C. at which time the gas was switched to substantially oxygen-free nitrogen (i.e., dried by passing through an approximately 7 inch column of a hydrous calcium sulfate) also flowing at 500 cc/minute. The temperature was maintained at 1600° C. for about ½ hour and then lowered to room temperature at a rate of 300° C. per hour.

Visual examination of the sample showed a color change to a golden color. An increase in the sample weight indicated an reaction. Further analysis showed that diffusion of the nitrogen into the ZBC body to form ZrN had occurred which varied from about 25 microns to 500 microns depending on the positioning of the sample within the flow of nitrogen gas passing through the furnace (e.g., upstream or downstream of the nitrogen go flow).

Figure 5:
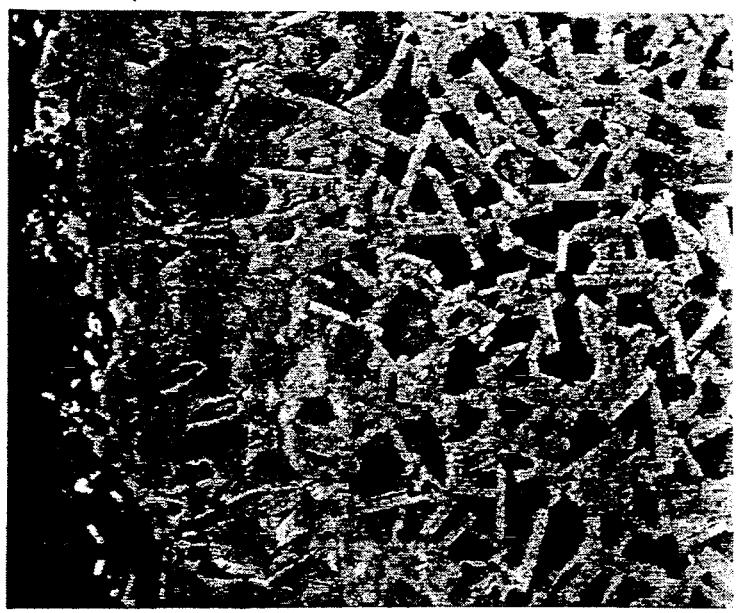
FIG. 5 is a photomicrograph at 400× of a section of the composite produced according to Example 8.

FIG. 5 is a photomicrograph at 400× of a section of the nitrided ZBC body formed according to this Example. Specifically, the lighter colored region to the left of FIG. 5 represents the nitrided region. The darker region to the right represents the original ZBC body.

EXAMPLE 9

Example 8 was substantially repeated using a ZBC bar shaped body with dimensions of about 1.1 cm long by 0.59 cm thick by 0.26 cm wide and weighing about 1.1 grams. The nitridation reaction temperature was maintained at about 1600° C. for about 1 hour and then lowered to room temperature at a rate of 300° C. per hour.

Visual examination of the sample showed a color change to a golden color. An increase in the sample weight indicated a reaction. Further analysis showed that diffusion of the nitrogen into the ZBC body was approximately 100 microns.

Figure 6:
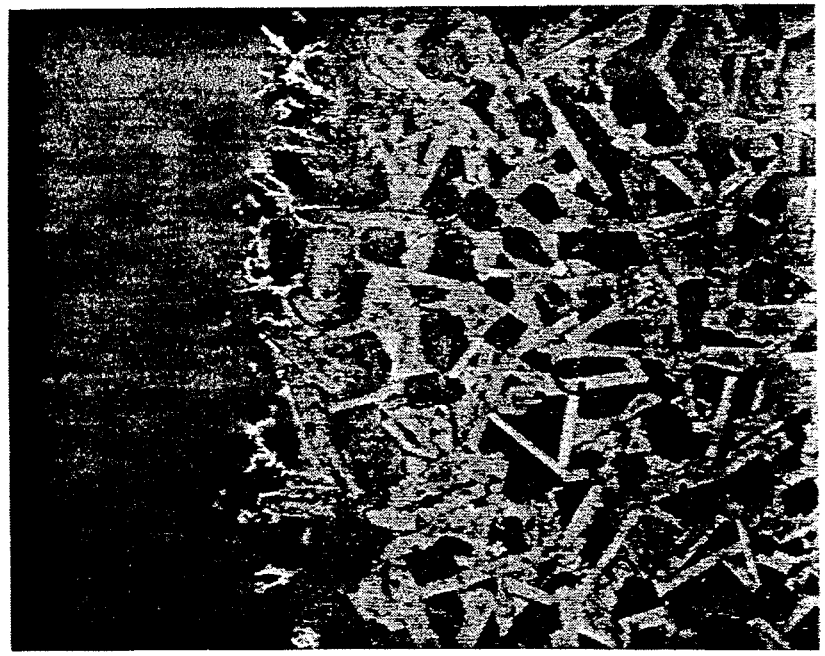
FIG. 6 is a photomicrograph at 50× of a section of the composite produced according to Example 9.

FIG. 6 is a photomicrograph at 400× of a section of the nitrided ZBC body formed according to this Example. Specifically, the lighter colored region to the left of FIG. 6 represents the nitrided region. The darker region to the right represents the original ZBC body.

EXAMPLE 10

Example 8 was substantially repeated using a ZBC bar shaped body with dimensions of about 1.9 cm long by 0.59 cm thick by 0.26 cm wide and weighing about 1.8 grams. The reaction temperature was maintained at about 1600° C. for about 2 hours.

Visual examination of the sample showed a color change to a golden color. Further analysis showed that nitrogen had diffused into the ZBC body to a depth of approximately 250 microns.

Figure 7:
FIG. 7 is a photomicrograph at 50× of a section of the composite produced according to Example 10.

FIG. 7 is a photomicrograph at 400× of a section of the nitrided ZBC body formed according to this Example. Specifically, the lighter colored region to the left of FIG. 8 represents the nitrided region. The darker region to the right represents the original ZBC body.

EXAMPLE 11

Example 8 was substantially repeated using a ZBC bar shaped body with dimensions of about 1.5 cm long by 0.59 cm thick by 0.26 cm wide and weighing about 1.8 grams. The reaction temperature was maintained at about 1600° C. for about 4 hours.

Visual examination of the sample showed a color change to a golden color. There was a relative increase in the sample weight (about 2.7% by weight) indicating a more complete reaction. Further analysis showed that diffusion of the nitrogen into the ZBC body had occurred through substantially the entire body. There was an outer larger scale comprising ZrN and ZrC which was about 125 microns thick, while the remainder of the body was composed of a composite of ZrC and residual Zr. Particularly, Examples 7 through 11 demonstrate that a post-treatment process may be controlled by selecting an appropriate reaction time to provide a post-treated composite possessing a modified region having a predetermined thickness.

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention as defined in the appended claims.

What is claimed is:

1. A method of producing a self-supporting body comprising producing a first composite body by:
   selecting a parent metal;
   providing a permeable mass comprising at least one material selected from the group consisting of a donor material and a carbon donor material;
   heating said parent metal in a substantially inert atmosphere to a temperature above its melting point to permit infiltration of molten parent metal into said permeable mass and to permit reaction of molten parent metal with said permeable mass;
   continuing said infiltration reaction for a time sufficient to produce said first composite body; and
   subjecting said first composite body to a post-treatment process, wherein said post-treatment process comprises exposing said first composite body to at least one environment selected from the group consisting of a boriding environment, a nitriding environment and a high temperature assisted consolidation environment, which modifies at least a portion of said first composite body, thereby forming said self-supporting body.

2. The method according to claim 1, wherein said at least one environment comprises at least one environment selected from the group consisting of a bedding and an atmosphere, wherein said environment provides at least one species which that will react with at least a portion of said first composite body.

3. The method according to claim 1, wherein the temperature of said first composite body is raised to at least about the melting point of the residual parent metal in said first composite body during said post-treatment process.

4. A self-supporting body formed according to the process of claim

5. The method of claim 2, wherein said atmosphere is created by at least one method selected from the group consisting of providing a gaseous atmosphere, plasma spraying, ion beam spraying and sputtering.

6. The method of claim 1, wherein said high temperature assisted consolidation environment is created by at least one method selected from the group conssiting of hot isostatic pressing and hot pressing.

7. The method of claim 1, wherein said parent metal comprises at least one metal selected from the group consisting of zirconium, titanium, tantalum, hafnium and alloys thereof.

8. The method of claim 1, wherein said boriding environment comprises at least one environment selected from the group consisting of a boron-containing gas and a bedding comprising a boron source material.

9. The method of claim 1, wherein said nitriding environment comprises at least one environment selected from the group consisting of a nitrogen-containing gas and a bedding comprising a nitrogen source material.

10. The method of claim 8, wherein said boron source material comprises at least one material selected from the group consisting of boron carbide and boron powder.

11. The method of claim 9, wherein said nitrogen source material comprises zirconium nitride.

12. The method of claim 9, wherein said nitriding environment further comprises a gettering material.

13. The method of claim 1, wherein said permeable mass comprises boron carbide.

14. The method of claim 1, wherein said permeable mass further comprises a filler.

15. The method of claim 1, wherein said post-treatment process is carried out for a time sufficient to modify at least a portion of a surface of said first composite body.

16. The method of claim 1, wherein said post-treatment process is carried out for a time sufficient to modify substantially completely said first composite body.

17. A method of producing a self-supporting body comprising producing a first composite body by:
   selecting a parent metal;
   providing a permeable mass comprising at least one material selected from the group consisting of a boron donor material and a carbon donor material;
   heating said parent metal in a substantially inert atmosphere to a temperature above its melting point to permit infiltration of molten parent metal into said permeable mass and to permit reaction of molten parent metal with said permeable mass;
   continuing said infiltration reaction for a time sufficient to produce said first composite body; and
   subjecting said first composite body to a post-treatment process, wherein said post-treatment process comprises exposing said first composite body to at least two environments selected from the group consisting of a boriding environment, a nitriding environment, a caburizing environment and a high temperature assisted consolidation environment, which modifies at least a portion of said first composite body, thereby forming said self-supporting body.

18. The method of claim 17, wherein said carburizing environment comprises at least one environment selected from the group consisting of a carbon-containing gas and a carbon source material.

19. The method of claim 18, wherein said carbon-containing gas comprises at least one gas selected from the group consisting of $CO/CO_2$ and $H_2/CH_4$.

20. The method of claim 18, wherein said carbon source material comprises at least one material selected from the group consisting of graphite and carbon black.

21. The self-supporting body of claim 4, wherein said body comprises about 0–2 volume percent residual metal.

* * * * *